United States Patent [19]

Klass

[11] 4,147,456

[45] Apr. 3, 1979

[54] STORAGE OF FUEL GAS

[75] Inventor: Donald L. Klass, Barrington, Ill.

[73] Assignee: Institute of Gas Technology, Chicago, Ill.

[21] Appl. No.: 880,600

[22] Filed: Feb. 23, 1978

[51] Int. Cl.[2] .......... B65G 5/00

[52] U.S. Cl. .......... 405/210; 62/45; 405/53

[58] Field of Search .......... 61/0.5, 101; 62/45, 62/47; 114/256, 257; 166/271, 305 D

[56] References Cited

U.S. PATENT DOCUMENTS

| | | | |
|---|---|---|---|
| 3,392,530 | 7/1968 | Brandt | 61/0.5 |
| 3,889,477 | 6/1975 | Tam | 61/101 |
| 3,950,958 | 4/1976 | Loofbourow | 62/45 |

*Primary Examiner*—Mervin Stein
*Assistant Examiner*—David H. Corbin
*Attorney, Agent, or Firm*—Thomas W. Speckman

[57] ABSTRACT

A method is provided for storing fuel gas by pumping the fuel gas into the lower portion of a storage vessel and automatically forming a solid fuel gas hydrate due to the vessel being positioned beneath the surface of a body of water and providing a lower zone having higher pressure relative to the atmosphere, sufficient to cause solid hydrate formation of the fuel gas and water, the vessel extending vertically toward the surface of the water and providing an upper zone having lower pressure, relative to the lower zone, sufficient to cause decomposition of the solid hydrate to fuel gas and water, and removing fuel gas for the desired use from the upper portion of the storage vessel. The method of this invention for storing fuel gas provides large, energy conserving, safe and low cost fuel storage areas beneath oceans and lakes, geographically close to the site of desired use.

10 Claims, 2 Drawing Figures

STORAGE OF FUEL GAS

Figure 1:
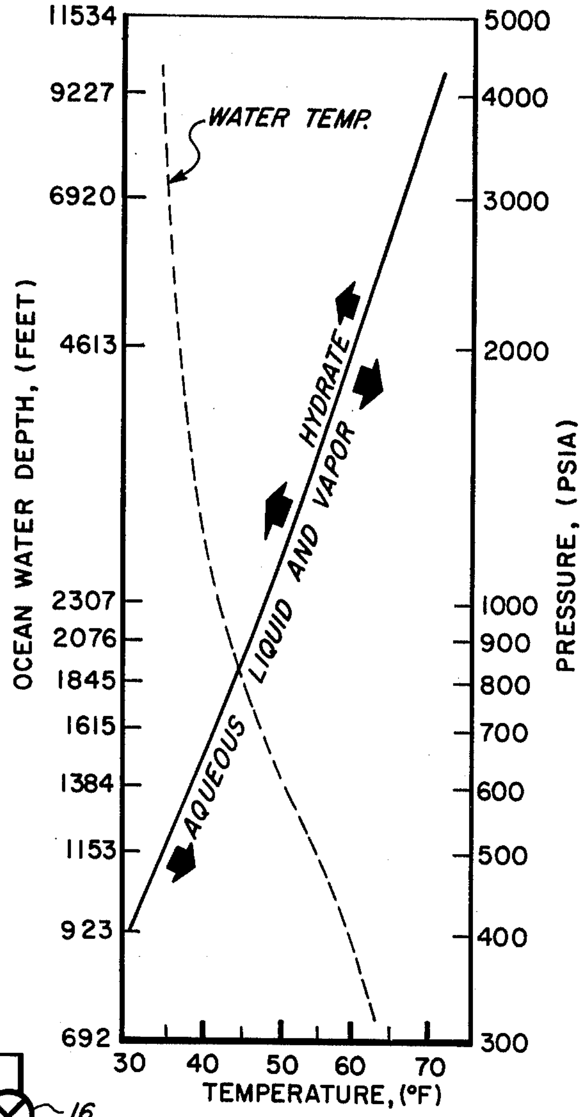

This invention relates to storage of fuel gas as solid hydrates in storage vessels beneath the surface of bodies of water such as lakes and oceans. Fuel gas has methane as the principal component and forms solid hydrates at temperatures and pressures found beneath the surface of deep lakes and oceans. The method of this invention provides for pumping fuel gas to be stored into the lower portion of a storage vessel and forming a solid hydrate. The storage vessel has closed sides and top and is secured in a vertical position beneath the surface of a body of water extending vertically through the water so that the vessel provides a lower zone having higher pressure, relative to the atmosphere, sufficient to cause hydrate formation of said fuel gas and water. In temperate and tropical latitudes, this lower zone will also usually have a lower temperature than the atmosphere. The vessel provides an upper zone having lower pressure, relative to the lower zone, sufficient to cause decomposition of the solid fuel gas hydrate to form fuel gas and water. In temperate and tropical latitudes, this upper zone will also usually have a higher temperature than the lower zone. The fuel gas is removed from the upper portion of the storage vessel for desired use. The water falls to the lower zone of the vessel. The hydrate-forming and hydrate-decomposition relations of pressure and temperature are maintained by positioning the storage vessel in a suitable position beneath the surface of a body of water. The water for hydrate formation is provided by the water formed from hydrate decomposition and any makeup water necessary is provided by the body of water in which the vessel is secured. The method of this invention provides low-cost storage facilities for large volumes of fuel gas such as natural gas, synthetic natural gas and the like.

Previous methods of storage of fuel gas have most frequently involved surface storage in vessels which are subjected to relatively high pressures and require safeguards against leakage, thus rendering such storage facilities expensive. Attempts to avoid these disadvantages have been made by storage of fuel gas in natural subterranean cavities, but these are subject to undesired fractures and leakage. U.S. Pat. No. 3,306,354 is exemplary of such subterranean storage. U.S. Pat. No. 3,559,737 teaches the use of gas hydrates to prevent leakage from underground gas storage reservoirs by sealing broken or cracked formations.

Natural gas hydrates have been known, mostly for their nuisance aspects, in the production and transmission of pressurized natural gas. Prevention of hydrate formation in underground gas storage caverns is discussed in U.S. Pat. No. 3,392,530. Enormous reserves of natural gas are also known to exist in hydrate form and recovery from such subterranean gas hydrate reservoirs is of current interest as illustrated by U.S. Pat. No. 4,007,787.

It is an object of this invention to provide storage of fuel gas in the hydrate form.

It is another object of this invention to provide storage of fuel gas in the solid hydrate form within a vessel secured beneath the surface of a body of water and providing both a hydrate formation zone and a hydrate decomposition zone as a result of pressure conditions provided by the body of water.

It is yet another object of this invention to provide a method of fuel gas storage which does not require expensive pressure vessels.

It is still another object of this invention to provide fuel gas storage relatively close to fuel gas use sites throughout the world.

Figure 2:
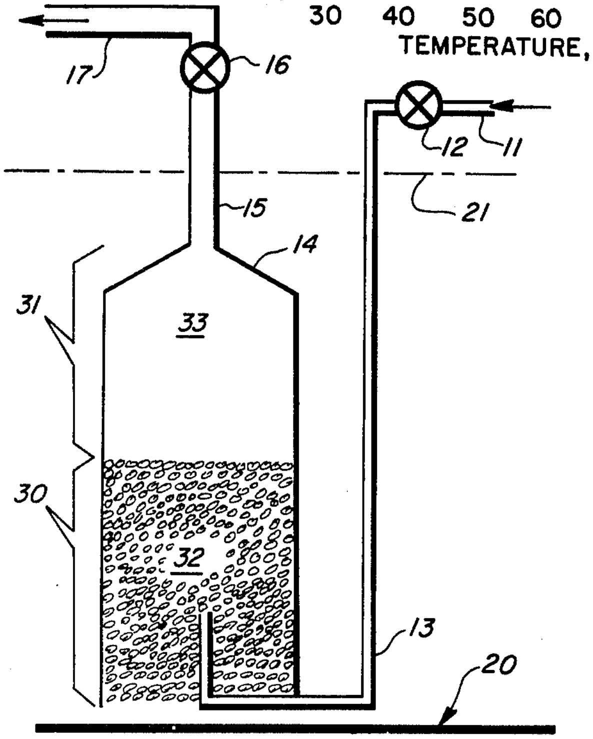

These and other objects and advantages of the invention will become apparent to one skilled in the art upon reading the following description in reference to the figures showing preferred embodiments wherein:

FIG. 1 shows hydrate formation and hydrate decomposition for methane and water at various pressures and temperatures and shows the pressure and water temperature corresponding to water depth of the ocean in the tropical and sub-tropical zone; and FIG. 2 shows schematically a storage vessel located beneath the surface of a body of water and having a hydrate-forming and hydrate decomposition zone.

FIG. 1 shows that hydrate-forming conditions of temperature and pressure for the formation of solid methane hydrate exists at water depths practical for securing the lower portion of a storage vessel. FIG. 1 shows the water temperature for oceans in the tropical or sub-tropical zones and thus, show the highest pressure requirements for hydrate formation. In the temperate zone, the temperature at a depth of about 650 feet is about 41° F. and in the polar zone, the temperature is about 32° F. up to the water surface. FIG. 1 shows that in tropical zones water depths of about 2000 feet and greater result in hydrate formation conditions for methane while in arctic zones depths of less than about 1000 feet result in such conditions. The hydrate formation temperatures and pressures also vary somewhat for gaseous components of the fuel gas other than methane, such as ethane, propane and butane. FIG. 1 also shows that a storage vessel secured in a vertical position beneath the surface of a body of water may also provide an upper zone wherein the pressure is lower and the temperature may be higher to provide an upper zone in the storage vessel suitable for hydrate decomposition into water and fuel gas.

The term fuel gas as used in this disclosure and claims includes natural gas, substitute natural gas (SNG) and any other gaseous organic which forms a solid hydrate with water under pressure and temperature conditions obtainable at reasonable water depths. Methane is the major component of natural gas, SNG and other fuel gases and is known to form the hydrate $CH_4.7H_2O$. Ethane propane and normal-butane hydrates at lower temperature and/or higher pressure conditions. Higher hydrocarbons are too large to enter the hydrate crystal lattice and thus do not hydrate under any conditions.

FIG. 2 shows schematically one embodiment of an apparatus and method for storing fuel gas as a hydrate according to this invention. The fuel gas to be stored is introduced via fuel gas inlet 11 through gas inlet valve 12 and gas inlet conduit 13 to the lower portion of storage vessel 14. Storage vessel 14 is beneath water surface 21 representing the surface of a lake or ocean. The floor of the lake or ocean is represented by line 20. Storage vessel 14 is open on the bottom and has closed sides and top and is secured in a vertical position in the body of water. The means of securement are not shown but may be any fixed or adjustable securement means either holding storage vessel 14 in fixed relationship to water surface 21 or in movable relationship to water surface 21 to provide differing conditions of temperature and pressure within the vessel. Vessel 14 extends through a vertical portion of the body of water providing pressure and temperature conditions for hydrate formation denoted in FIG. 2 as hydrate formation zone 30 in its lower portion, and conditions of lower pressure and possibly increased temperature to provide conditions for hydrate decomposition shown as hydrate decomposition zone 31. Solid hydrate is indicated by 32 and fuel gas in the gaseous form by 33. The top of storage vessel 14 is preferably conical or domed and gas 33 may pass through gas outlet conduit 15 controlled by gas outlet valve 16 to gas outlet 17 supplying the fuel gas to the desired pressurized storage or directly for utilization.

It is seen that fuel gas introduced to the bottom portion of storage vessel 14 through gas inlet conduit 13, is subjected to hydrate-forming pressure and temperature conditions due to the vessel's location beneath the surface of a body of water and solid fuel gas hydrate is spontaneously formed. Any suitable distribution means, such as a manifold providing a number of outlets, may be used to distribute the introduced gas across the bottom portion of the storage vessel to form the solid hydrate. The bottom of the storage vessel may be open or may have sufficient open space, such as holes, to provide makeup water necessary for hydration and to provide a pressure corresponding to the water depth. As the solid hydrate is formed, it will, with adequate fuel gas supply, fill the vessel to a point where, dependent upon the fuel gas composition and the temperature and pressure conditions, an equilibrium is established between the gas in the decomposition zone 31 and the solid hydrate in the hydrate formation zone 30. Opening gas outlet valve 16 permits the flow of gas from hydrate decomposition zone 31 to the gas outlet, providing an automatic pressurized withdrawal system. As the gas is withdrawn from the top of storage vessel 14, the solid hydrate will automatically move upward toward the hydrate decomposition zone. New solid hydrate may be formed by providing fuel gas to the lower portion of storage vessel by control of gas inlet valve 12. It is seen that the hydrate formation, hydrate movement, hydrate decomposition and fuel gas withdrawal, is automatically obtained as a result of the fuel gas entering inlet 11 being under sufficient pressure to pass through gas inlet conduit 13 to the lower portion of storage vessel 14. This minimizes pumping equipment necessary and completely eliminates the necessity for providing any means of movement of the solid material. Any suitable gas pump may be used, the only requirement being that capacity and pressure is sufficient to introduce the desired volume of gas into the hydrate formation zone at the desired rate.

The fuel gas storage method of this invention also greatly reduces the pressure requirements of the containment vessel. It is seen that the pressure differential between the inner and outer surface of the storage vessel is considerably less than conventional surface storage methods. This allows utilization of plastic storage vessels such as fiberglass reinforced resins and the like. The plastic storage vessels are desirable for the elimination of corrosion or other chemical action. Metallic storage vessels may also be used. It is apparent that the shape of the storage vessel may be altered considerably, such as, enlarging the diameter of the solid hydrate storage volume and decreasing the diameter of the hydrate decomposition zone or gas storage volume as desired for the particular application. The storage vessel may also be two separate portions connected by a vertical pipe to provide depth necessary to obtain the desired pressure and/or temperature for solid hydrate formation in the lower portion and hydrate decomposition in the upper portion. Reference to vessels having sides and a top include vessels having the shape of an inverted funnel wherein the lower portion is referred to as sides and the upper portion is referred to as top.

The fuel gas storage method of this invention may also provide automatic purification of the fuel gas through the hydrate-formation and hydrate-decomposition steps. Particulate matter in the fuel gas stream will be removed by this storage process as well as certain higher organic contaminates which are undesirable. These contaminates will not form hydrates and may be drawn off the surface of the liquid in the storage vessel by appropriate side pipes at various levels.

The method for storing fuel gas according to this invention provides more efficient utilization of storage volumes in view of the reduction in volume of the gas on formation of the solid hydrates. According to the method of this invention, large, energy conserving, safe and low cost storage areas may be provided.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A method for storing fuel gas comprising: pumping fuel gas to be stored into the lower portion of a storage vessel and forming a solid fuel gas hydrate, said vessel having closed sides and top and secured in a vertical position beneath the surface of a body of water, said vessel providing a lower zone having higher pressure, relative to the atmosphere, sufficient to cause solid hydrate formation of said fuel gas and water, said vessel providing an upper zone having lower pressure, relative to said lower zone, sufficient to cause decomposition of said solid hydrate to fuel gas and water; removing fuel gas for desired use from the upper portion of said storage vessel.

2. The method of claim 1 wherein said lower zone has a lower temperature than the atmosphere and said upper zone has a higher temperature than said lower zone.

3. The method of claim 1 wherein said fuel gas comprises methane as the major component.

4. The method of claim 1 wherein said fuel gas is natural gas.

5. The method of claim 1 wherein said fuel gas is substitute natural gas (SNG).

6. The method of claim 1 wherein said storage vessel is beneath the surface of an ocean.

7. The method of claim 1 wherein said storage vessel is the shape of an inverted funnel.

8. The method of claim 1 wherein said storage vessel has separate upper and lower portions connected by a vertical pipe.

9. The method of claim 1 wherein said storage vessel is a single chamber vessel.

10. The method of claim 1 wherein particulate matter and higher organic contaminates are removed from the hydrate formation-decomposition steps.

* * * * *